United States Patent
Spuller

(10) Patent No.: US 7,371,063 B2
(45) Date of Patent: May 13, 2008

(54) INJECTION MOLDING NOZZLE

(75) Inventor: Swen Spuller, Forchheim (DE)

(73) Assignee: Otto Männer Innovation GmbH, Bahlingen (DE)

( * ) Notice: Subject to any disclaimer, the term of this patent is extended or adjusted under 35 U.S.C. 154(b) by 268 days.

(21) Appl. No.: 11/254,518

(22) Filed: Oct. 20, 2005

(65) Prior Publication Data
US 2006/0088619 A1    Apr. 27, 2006

(30) Foreign Application Priority Data
Oct. 23, 2004   (DE)   .................. 10 2004 051 750

(51) Int. Cl.
    B29C 45/23       (2006.01)
(52) U.S. Cl. ..................... 425/564; 425/566
(58) Field of Classification Search ............... 425/562, 425/563, 564, 565, 566
    See application file for complete search history.

(56) References Cited

U.S. PATENT DOCUMENTS

| 2,972,776 | A | * | 2/1961  | Siegrist .................. 425/565 |
| 4,286,941 | A | * | 9/1981  | Gellert .................. 425/566 |
| 4,781,554 | A | * | 11/1988 | Hendry .................. 425/564 |
| 4,783,298 | A | * | 11/1988 | Oda ..................... 425/566 |
| 4,919,606 | A | * | 4/1990  | Gellert .................. 425/564 |
| 5,090,890 | A | * | 2/1992  | Morita ................... 425/564 |
| 5,104,305 | A | * | 4/1992  | Kawaguchi et al. ....... 425/562 |
| 5,700,499 | A | * | 12/1997 | Bauer .................... 425/564 |
| 6,234,783 | B1| * | 5/2001  | Shibata et al. .......... 425/562 |
| 6,638,050 | B2| * | 10/2003 | Bazzo et al. ............ 425/564 |

* cited by examiner

Primary Examiner—Tim Heitbrink
(74) Attorney, Agent, or Firm—Klaus J. Bach

(57) ABSTRACT

In a hot channel injection molding nozzle comprising a nozzle body including a mass flow channel for a melt to be injected into a mold, wherein the nozzle body has a nozzle outlet opening at one end and an inlet opening disposed at one side of the other end of the nozzle body and a valve needle extending through the nozzle body to the outlet opening for blocking the melt flow, a valve needle guide sleeve is disposed in the nozzle body so as to delimit the mass flow channel in the area of the inlet opening with the valve needle extending through the guide sleeve.

8 Claims, 2 Drawing Sheets

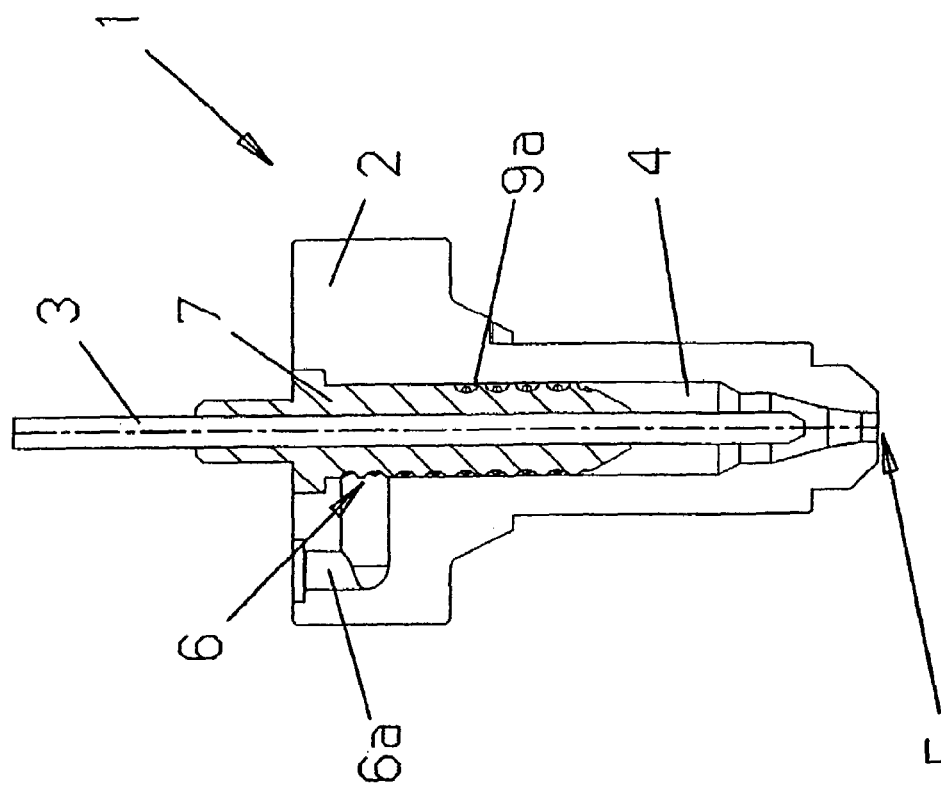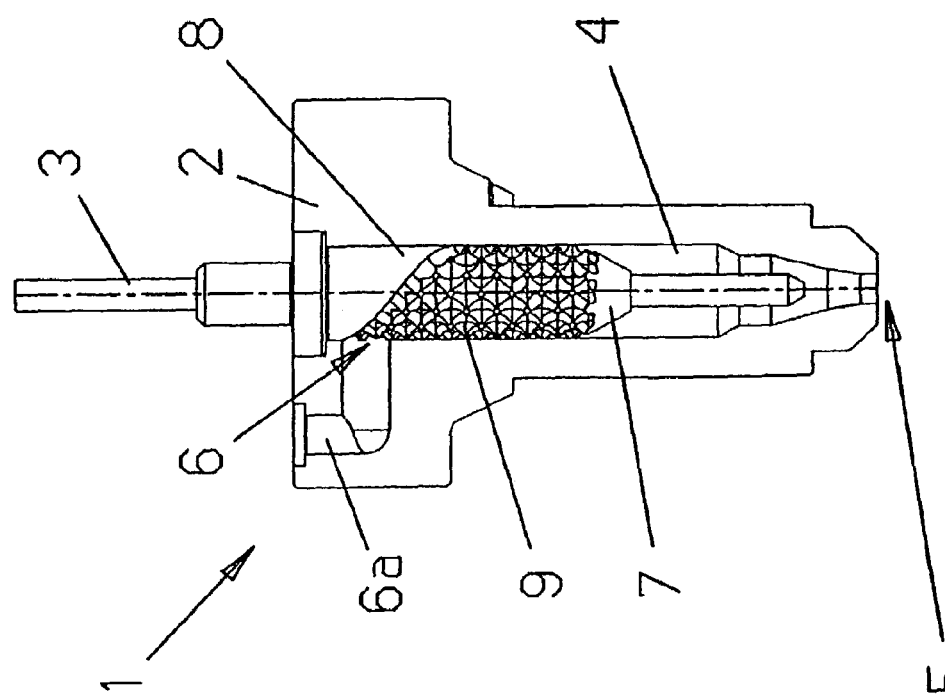

INJECTION MOLDING NOZZLE

BACKGROUND OF THE INVENTION

The invention relates to an injection molding nozzle for hot channel injection molds, comprising a nozzle body which has a mass flow channel for a melt provided at one end with a nozzle discharge opening and, at its other end, with a supply opening arranged at the side of the nozzle body through which a valve needle extends for controlling the discharge of the melt from the nozzle opening.

Such a hot channel nozzle is known, for example, from DE 199 50 273 C1. In the known hot channel nozzle, which is generally installed in an injection molding tool, molten plastic is conducted via channels arranged in the injection molding tool by way of the side supply openings to the mass flow channel. By way of the mass flow channel, which is generally filled with melt, the melt reaches the nozzle discharge opening. When the valve needle opens the nozzle discharge opening, melt can flow into the mold disposed adjacent the nozzle discharge opening. When the valve needle closes, the discharge opening the melt is retained in the mass flow channel. Instead of closing the nozzle discharge opening by the valve needle, also a connecting passage in the injection molding may be closed. In that case, the nozzle discharge opening serves as guide structure for the valve needle.

In order to achieve a high quality for the injection molded parts, it is very important that the melt has a homogeneous consistency. However, the homogeneous consistency which may still be present at the supply opening may be disturbed by the valve needle disposed in the mass flow channel. Since the melt enters the mass flow channel through side openings, it impinges onto the valve needle whereby the melt flow is divided into two parts. Although the two partial flows meet again behind the valve needle, flow lines can be formed. Such flow lines are very objectionable since the flow lines are optically apparent in the injection-molded component and may result in discarding the product. Furthermore, in remote areas of the mass flow channel, melt material may be retained in the known hot channel nozzles and re-entrained into the melt flow at a later time, whereby the homogeneous consistency is also much disturbed.

WO 01/34365 A1 discloses a mixing device for injection molding machines which includes a mass flow channel for plastic material melts with a supply opening arranged at a front end and an outlet opening at the opposite end. In the mass flow channel a cylindrical closure element is disposed by which the outlet opening can be closed.

The closure element or valve needle extends through a bushing whose outer wall is disposed closely adjacent the mass flow channel. At the inner wall, the sleeve is provided with a groove which extends spirally over the full length of the sleeve and which forms a channel with the wall of the mass flow channel. The web formed between two adjacent grooves of the spiral groove structure is disposed at the end of the sleeve remote from the outlet opening of the sleeve tightly on the closure element at least over a full turn. In this way, the melt can reach the outlet opening only through the groove or, respectively, the closed channel formed by means of the closure element.

However, in the direction toward the outlet opening a continuously increasing gap is formed between the web and the closure element so that the melt can flow through that gap also in axial direction to the outlet opening. In this way, a good mixture of the melt is to be obtained. The problem encountered with a side admission opening for the melt however cannot be eliminated by the known mixing element.

It is the object of the invention to provide a hot channel nozzle of the type referred to above in such a way that the melt is delivered with a very high homogeneous consistency.

SUMMARY OF THE INVENTION

In a hot channel injection molding nozzle comprising a nozzle body including a mass flow channel for a melt to be injected into a mold, wherein the nozzle body has a nozzle outlet opening at one end and an inlet opening disposed at one side of the other end thereof and a valve needle extending through the nozzle body to the outlet opening for blocking the outlet opening, a valve needle guide sleeve is disposed in the nozzle body so as to delimit the mass flow channel in the area of the inlet opening with the valve needle extending through the guide sleeve.

With the sleeve disposed in the space around the valve needle and receiving the valve needle so that the area of the mass flow channel around the supply opening is delimited, it is avoided in an advantageous way that the melt reaches remote areas of the mass flow channel. Melt deposits in parts of the mass flow channel are avoided so that residual melt can no longer mix with new melt. It is ensured in this way that the melt has a very homogeneous consistency.

It is particularly advantageous if the delimitation is such that a melt flow into the area of the mass flow channel opposite the admission opening is avoided, since in the area opposite the admission opening, on one hand, the chance that the melt is retained in the mass flow channel is particularly high and, on the other hand, flow lines are particularly easily formed. Obviously, it is to be avoided that the melt reaches that part of the mass flow channel which when viewed from the outlet opening, is disposed beyond the inlet opening as the chances of the melt forming deposits is particularly high in that area.

An embodiment of the invention, wherein the delimitation of the mass flow channel becomes less restrictive toward the outlet opening has been found to be very advantageous. As the mass flow channel becomes wider toward the exit opening the melt flow expands slowly and extends all around the valve needle. This is particularly advantageous with regard to avoiding the formation of flow lines.

In another embodiment of the invention, the needle guide sleeve completely occupies at least the space remote from the outlet opening beyond the inlet opening. In this way, the flow space is delimited in the area of the inlet opening in a simple manner as no melt can enter the area in which the needle guide sleeve fully occupies the mass flow channels. In addition, a space delimitation can be established in this way in a very simple and inexpensive way.

An embodiment of the invention, wherein the needle guide sleeve is provided at its surface with recesses which form channels with the wall of the mass flow channel has been found to be particularly advantageous. The recesses or, respectively, channels define the path for the melt flow in a particularly simple way. In the areas where the needle guide sleeve has no recesses, the needle guide sleeve completely fills the mass flow channel so that the mass flow channel space around the inlet opening can be limited in providing no recesses or flow passages in the needle guide sleeve in the respective area.

In the last mentioned embodiment, it is very advantageous if the recesses extend thread-like around the needle guide sleeve. It is particularly advantageous if at least two recesses are provided which are in the form of a single-pass right, or respectively, left hand thread. In this way, one twist while the other channel extends once around the needle guide sleeve with a right twist, such that the two channels intersect at the side of the needle guide sleeve opposite the inlet opening. With the channels intersecting the mixing action is increased and consequently the homogeneity of the melt flow is improved.

The mixing of the melt flow however may be substantially increased in that the needle guide sleeve is provided with a plurality of parallel recesses. It is then very advantageous if the recesses or, respectively, the respective channels start out each in the recesses or, respectively, channels, which extend on the surface of the needle guide sleeve like a single-pass left hand or, respectively, right hand thread. With the multitude of the parallel-extending recesses also a plurality of intersections are formed whereby a very good mixing and consequently homogeneity of the melt is obtained. In this way, the formation of flow lines is almost completely avoided.

An embodiment of the invention wherein the cross-section of the recesses increases with increasing distance from the inlet opening is also very advantageous. In this way, advantageously about the same melt mass flow passes through the area of the mass flow channel opposite the inlet opening as through the area adjacent the inlet opening. The greater length of the melt travel passing through the channel extending to the side remote from the inlet opening is compensated for by an increase in the cross-section of the recesses. Also, in this way, the homogeneity of the melt is increased and a uniform melt flow front is obtained.

The present invention will become more readily apparent from the following description of a particular embodiment of the invention with reference to the accompanying drawings.

BRIEF DESCRIPTION OF THE DRAWINGS

FIG. 1 shows a hot channel nozzle according to the invention in a cross-sectional view with a needle guide sleeve with non-intersecting channels, FIG. 2 shows the hot channel nozzle as shown in cross-section in FIG. 1 with the needle guide sleeve also shown in cross-section.

DESCRIPTION OF A PARTICULAR EMBODIMENT

Figure 3:
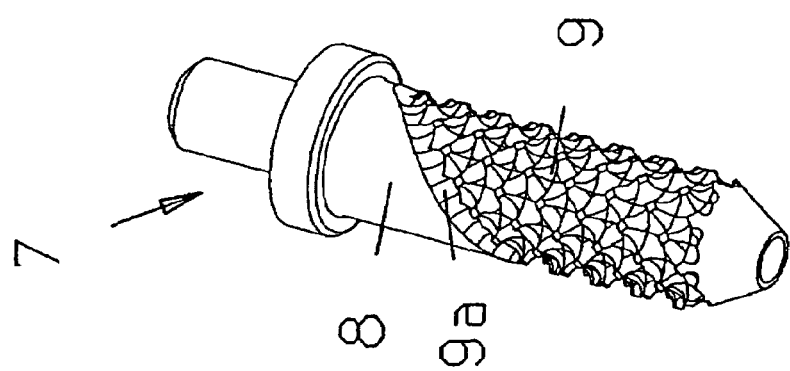
FIG. 3 shows a needle guide sleeve in a perspective view.

As apparent from FIGS. 1 and 2, a hot channel nozzle 1 comprises a nozzle body 2, through which a melt mass flow channel 4 extends. The mass flow channel 4 has at one end thereof an inlet opening 6 by way of which a plastic material melt can be supplied to the mass flow channel 4 via a supply passage 6a formed into the nozzle body 2. At the other end, the mass flow channel 4 has a nozzle-shaped outlet opening 5. The nozzle outlet opening 5 or an adjacent connecting opening of the injection molding tool which is not shown can be opened or closed by a valve needle 3, which extends axially through the mass flow channel 4.

At the end of the mass flow channel 4 opposite the nozzle outlet opening 5, a needle guide sleeve 7 is arranged in the mass flow channel 4 and a valve needle 3 extends through the needle guide sleeve 7 in which the valve needle 3 is axially movably and sealingly supported. The mass flow channel 4 is sealingly closed by the needle guide sleeve 7 at its one end opposite the nozzle outlet opening 5.

At its end remote from the nozzle outlet opening 5, the needle guide sleeve 7 completely fills a partial area 8 of the mass flow channel 4. This means the diameter of the needle guide sleeve 7 corresponds in the partial area 8 to the diameter of the mass flow channel 4.

As apparent particularly from FIG. 1, the partial area 8 extends partially up to the inlet opening 6. In this way, the space of the mass flow channel 4 around the inlet opening 6 is delimited.

Figure 4:
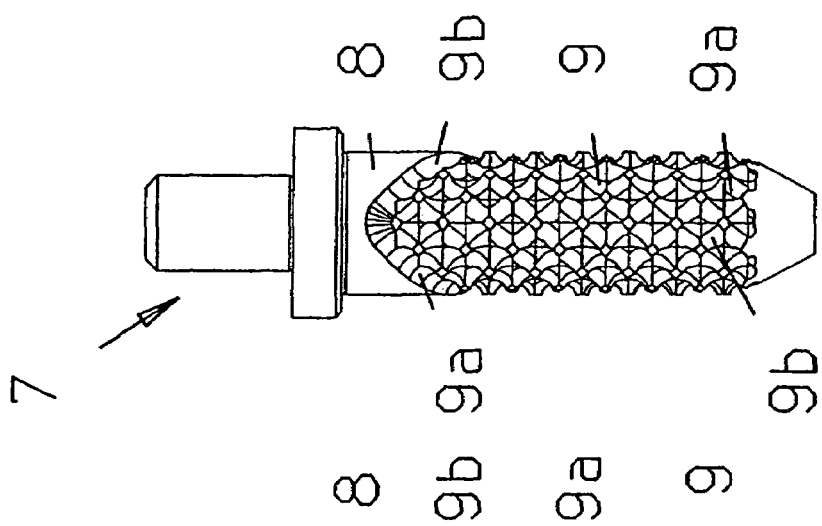
FIG. 4 is a front view of the needle guide sleeve shown in FIG. 3.
Figure 5:
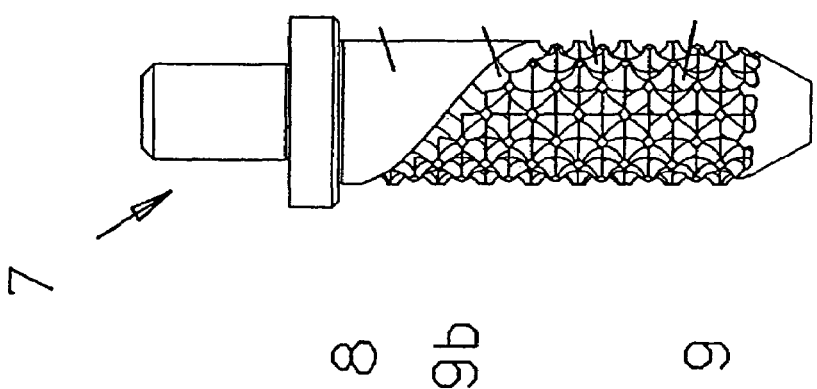
FIG. 5 is a side view of the needle guide sleeve shown in FIG. 3.
Figure 6:
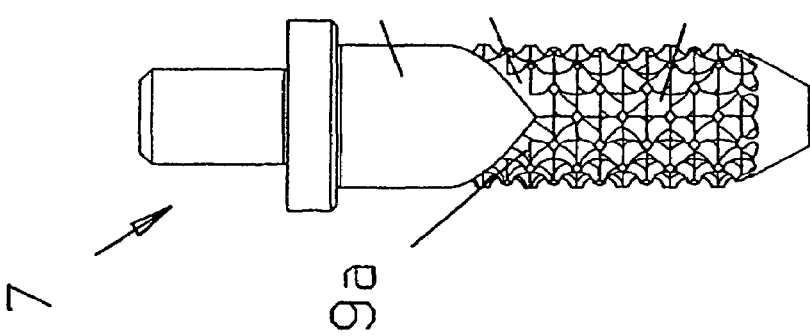
FIG. 6 is a rear view of the needle guide sleeve shown in FIG. 3.

As apparent particularly from FIGS. 3 to 6, the surface of the needle guide sleeve 7 is provided outside the partial area 8 with recesses 9. The recesses 9 form closed flow channels together with the mass flow channel or, respectively, the nozzle body 2. The melt is therefore forced to follow the path of the channels.

The delimitation of the partial area 8 extends along a course following each half a length of a single-pass left or right hand thread. Next to the delimitation of the partial area 8, there are two recesses 9a, 9b which extend about in the form of a single pass right or, respectively, left thread so that the recesses or, respectively, the channels formed by the recesses intersect after half a thread pass. This means that the channel formed by the recesses 9a, 9b intersect at the point where the partial area 8 reaches the lowest point. As apparent particularly from FIG. 4, the two channels formed by the recesses 9a, 9b meet again after a couple turns around the needle guide sleeve 7.

Parallel to the recesses 9a, 9b, which are in the form of a single-pass left, or, respectively right thread, there is a multitude of recesses 9, which extend parallel to one another. The channels formed by the parallel-extending recesses all start out in the recesses 9a, 9b, which have the form of a single-pass right or left thread. With the multitude of the parallel recesses 9, a plurality of intersections is formed whereby very good mixing of the melt is achieved.

As apparent particularly from FIG. 2, the open width of the recesses 9c at the side of the needle guide sleeve 7 opposite the inlet opening 6 is larger than at the side adjacent the inlet opening 6. In this way, almost the same amount of melt flows toward the nozzle outlet opening 5 in the area of the mass flow channel 4 remote from the inlet opening 6 as in the area adjacent the inlet opening. As a result, the melt flowing out of the recesses 9 into the mass flow channel 4 has a uniform flow front.

What is claimed is:

1. A hot channel injection molding nozzle comprising a nozzle body (2) including a mass flow channel (4) for a melt to be injected into a mold, said nozzle body (2) having a nozzle outlet opening (5) at one end thereof and, at the opposite end, an inlet opening (6) disposed at one side of the nozzle body (2), a valve needle (3) extending through the nozzle body (2) for controlling the melt flow through the outlet opening (5) and a valve needle guide sleeve (7) disposed in the nozzle body (2) and delimiting the mass flow channel (7) in the area of the inlet opening (6), with the valve needle (3) extending through the valve needle guide sleeve (7), the valve needle guide sleeve (7) being provided at the surface thereof with recesses (9) which form guide channels with the wall of the mass flow channel (4).

2. An injection molding nozzle according to claim 1, wherein the delimitation of the mass flow channel is such that a melt flows into the area of the mass flow channel (4) opposite the outlet opening beyond the inlet opening is prevented.

3. An injection molding nozzle according to claim 1, wherein the delimitation of the mass flow channel (4) extends toward the nozzle outlet opening (5).

4. An injection molding nozzle according to claim 1, wherein the needle guide sleeve (7) fills at least the area (5) of the mass flow channel (4) opposite the outlet opening beyond the inlet opening (6) and the area on the side of the needle guide sleeve (7) opposite the inlet opening (7).

5. Art injection molding nozzle according to claim 1, wherein the guide channels (9) extend thread-like around the needle guide sleeve (7).

6. An injection molding nozzle according to claim 1, wherein at least two guide channels (9a, 9b) are provided in the form of a single-pass left or, respectively, right hand thread.

7. An injection molding nozzle according to claim 1, wherein a plurality of guide channels (4) are present which extend parallel to one another.

8. An injection molding nozzle according to claim 1, wherein the cross-section of the guide channel (9c) increases with increasing distance from the inlet opening (6).

* * * * *